United States Patent
Iura et al.

(10) Patent No.: US 6,476,125 B1
(45) Date of Patent: *Nov. 5, 2002

(54) FLUORINE-CONTAINING POLYMER ALLOY, AND METHOD FOR ITS PREPARATION AND METHOD FOR ITS MOLDING

(75) Inventors: Jun-ichi Iura, Kooriyama (JP); Eiichi Nishi, Kawasaki (JP); Masataka Yokota, Kawasaki (JP)

(73) Assignee: Asahi Glass Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 984 days.

(21) Appl. No.: 08/701,011

(22) Filed: Aug. 21, 1996

(30) Foreign Application Priority Data

Aug. 24, 1995 (JP) .............................................. 7-216343

(51) Int. Cl.[7] .......................... C08L 51/06; C08L 27/12
(52) U.S. Cl. .......................... 525/66; 525/64; 525/67; 525/72; 525/133; 525/146; 525/148; 525/166; 525/175; 525/176; 525/179; 525/183; 525/189; 525/193; 525/194; 525/199; 525/200; 525/276
(58) Field of Search .............................. 525/64, 66, 67, 525/72, 193, 194, 199, 200, 276, 133, 148, 146, 166, 175, 176, 179, 183, 189

(56) References Cited

U.S. PATENT DOCUMENTS 4,505,982 A * 3/1985 Hoheisel ..................... 428/421
5,449,721 A 9/1995 Suzuki et al.
5,576,106 A * 11/1996 Kerbow ...................... 428/403

FOREIGN PATENT DOCUMENTS

| EP | 650987 | * | 5/1995 | |
| JP | 149250 | * | 6/1991 | ................. 525/199 |
| WO | WO 96/03448 | | 2/1996 | |

OTHER PUBLICATIONS

Patent Abstracts of Japan, vol. 95, No. 005, May 16, 1995, JP–A–07 126 515, & US 5 449 721, Sep. 12, 1995 & Chemical Abstracts, vol. 123, No. 12, Sep. 18, 1995, AN–145790.

Patent Abstracts of Japan, vol. 017, No. 173, Apr. 2, 1993, JP–A–04 329212, Nov. 18, 1992.

Patent Abstracts of Japan, vol. 95, No. 002, JP–A–07 041563, Feb. 10, 1995.

* cited by examiner

*Primary Examiner*—David J. Buttner
(74) *Attorney, Agent, or Firm*—Oblon, Spivak, McClelland, Maier & Neustadt, P.C.

(57) ABSTRACT

A fluorine-containing polymer alloy comprising a grafted fluorine-containing polymer (a) and a polymer (c) containing no fluorine atom, said grafted fluorine-containing polymer (a) comprising a fluorine-containing polymer (d) having hydrogen atoms bonded to carbon atoms of its main chain and a grafting compound having a linking group capable of grafting to the fluorine-containing polymer (d) and a functional group capable of providing an adhesive property, grafted to the fluorine-containing polymer (d).

8 Claims, No Drawings

FLUORINE-CONTAINING POLYMER ALLOY, AND METHOD FOR ITS PREPARATION AND METHOD FOR ITS MOLDING

The present invention relates to a fluorine-containing polymer alloy wherein a fluorine-containing polymer and a polymer containing no fluorine atoms are uniformly dispersed and mixed.

As represented by a tetrafluoroethylene polymer, a fluorine-containing polymer is excellent in heat resistance, flame retardancy, chemical resistance, weather resistance, non-tackiness, low friction and low dielectric properties, and it is used in a wide range of fields including fields of a coating material for a heat and flame resistant electrical wire, a corrosion resistant piping material for a semiconductor washing line, a corrosion resistant piping material for a chemical plant, a material for agricultural green houses, a release coating material for kitchen utensils and various materials for sliding action.

However, it is poor in the compatibility with other polymer materials containing no fluorine atom, and it thus has had a problem that a satisfactory polymer alloy can hardly be obtained. To improve the compatibility of the fluorine-containing polymer with a polyolefin, there has been proposed a method wherein a polyolefin is modified with an alkyl acrylate for use (Japanese Examined Patent Publication No. 73459,1992) or a method wherein a carbonyl group, a hydroxyl group or an epoxy group is incorporated to the fluorine-containing polymer (Japanese Unexamined Patent Publication No. 57448/1987).

The former method is effective in a case where the fluorine-containing polymer is, for example, a vinylidene fluoride polymer or a vinyl fluoride polymer which has a high polarity, but the compatibility with a fluorine-containing polymer having a low polarity such as a tetrafluoroethylene polymer or copolymer, or a chlorotrifluoroethylene polymer or copolymer, can not thereby be improved.

The latter method may, for example, be (1) a method of blending a fluorine-containing polymer with a non-fluorine type thermoplastic polymer containing a functional group, (2) a method of incorporating to a fluorine-containing polymer, polymer units derived from a polymerizable monomer having a functional group, (3) a method of reacting reactive groups present in a fluorine-containing polymer, with a compound having a functional group or with a compound which is capable of forming a functional group by the reaction, or (4) a method of modifying a fluorine-containing polymer by oxidation, hydrolysis or thermal decomposition.

However, with respect to a fluorine-containing polymer such as a tetrafluoroethylene polymer or copolymer, or a chlorotrifluoroethylene polymer or copolymer, the method (1) is not effective like the above-mentioned method, since no compatibility will be obtained as between such a fluorine-containing polymer and a non-fluorine type thermoplastic polymer containing a functional group. The method (2) is expensive as the monomer to be used for the copolymerization reaction is very limited, and such a method is not practical. The method (3) can not be employed since such a fluorine-containing polymer usually does not have reactive groups. The method (4) is not practical, since such a fluorine-containing polymer is stable, and it is difficult to form a carboxyl group, a hydroxyl group or an epoxy group by oxidation, hydrolysis or thermal decomposition.

On the other hand, it has been proposed to use as a molding material, a grafted fluorine-containing polymer comprising a fluorine-containing polymer having hydrogen atoms bonded to carbon atoms of its main chain and a grafting compound having a functional group and a linking group capable of grafting to the fluorine-containing polymer, grafted to the fluorine-containing polymer, and to prepare a molded product by a conventional molding method, such as a film or sheet, or a laminate by coextrusion molding, or a laminate prepared by laminating such a film or sheet with other molded product (Japanese Unexamined Patent Publications No. 173230/1995, No. 173446/1995 and No. 173447/1995).

It is an object of the present invention to prepare a polymer alloy excellent in the compatibility between a fluorine-containing polymer and a polymer containing no fluorine atoms, by a simple method.

The present inventors have found it very effective to employ as a compatibilizing agent a grafted fluorine-containing polymer (a) comprising a fluorine-containing polymer (d) having hydrogen atoms bonded to carbon atoms of its main chain and a grafting compound having a linking group capable of grafting to the fluorine-containing polymer (d) and a functional group capable of providing an adhesive property, grafted to the fluorine-containing polymer (d). The present invention has been accomplished on the basis of this discovery.

By using such a grafted fluorine-containing polymer (a) as a compatibilizing agent, it is possible to improve not only the compatibility with the polymer (c) containing no fluorine atoms but also the adhesive property between the fluorine-containing polymer (d) and the polymer (c) containing no fluorine atoms, whereby the compatibility will be improved, and it will be possible to obtain a fluorine-containing polymer alloy which can be uniformly dispersed with a small dispersed particle size.

Namely, the present invention provides such a fluorine-containing polymer alloy, a method for producing the fluorine-containing polymer alloy, and a molding method employing it, as follows.

A fluorine-containing polymer alloy comprising a grafted fluorine-containing polymer (a) and a polymer (c) containing no fluorine atom, said grafted fluorine-containing polymer (a) comprising a fluorine-containing polymer (d) having hydrogen atoms bonded to carbon atoms of its main chain and a grafting compound having a linking group capable of grafting to the fluorine-containing polymer (d) and a functional group capable of providing an adhesive property, grafted to the fluorine-containing polymer (d).

The above fluorine-containing polymer alloy which further contains a fluorine-containing polymer (b) other than the grafted fluorine-containing polymer (a).

A method for preparing a fluorine-containing polymer alloy, which comprises melt-mixing, at a radical-forming temperature, a fluorine-containing polymer (d) having hydrogen atoms bonded to carbon atoms of its main chain, a grafting compound having a linking group capable of grafting to the fluorine-containing polymer (d) and a functional group capable of providing an adhesive property, a radical-forming agent, and a polymer (c) containing no fluorine atom.

A method for preparing a fluorine-containing polymer alloy, which comprises melt-mixing, at a radical-forming temperature, a fluorine-containing polymer (d) having hydrogen atoms bonded to carbon atoms of its main chain, a grafting compound having a linking group capable of grafting to the fluorine-containing polymer (d) and a functional group capable of providing an adhesive property, a radical-forming agent, a polymer (c) containing no fluorine atom, and a fluorine-containing polymer (b') other than the fluorine-containing polymer (d).

A method for molding a fluorine-containing polymer alloy, which comprises melt-mixing and molding in a molding machine at a radical-forming temperature, a fluorine-containing polymer (d) having hydrogen atoms bonded to carbon atoms of its main chain, a grafting compound having a linking group capable of grafting to the fluorine-containing polymer (d) and a functional group capable of providing an adhesive property, a radical-forming agent, and a polymer (c) containing no fluorine atom.

A method for molding a fluorine-containing polymer alloy, which comprises melt-mixing and molding in a molding machine at a radical-forming temperature, a fluorine-containing polymer (d) having hydrogen atoms bonded to carbon atoms of its main chain, a grafting compound having a linking group capable of grafting to the fluorine-containing polymer (d) and a functional group capable of providing an adhesive property, a radical-forming agent, a polymer (c) containing no fluorine atom, and a fluorine-containing polymer (b') other than the fluorine-containing polymer (d).

The fluorine-containing polymer alloy is excellent in heat resistance, flame retardancy, chemical resistance, non-tackiness, low friction and low dielectric properties attributable to the fluorine-containing polymer and at the same time has various properties attributable to the other polymer material containing no fluorine atoms. Further, cost down can be expected as a fluorine-containing polymer. For example, it is expected to be useful in the fields of e.g. sliding materials for which low friction and low abrasion are required, heat resistant materials having high dimensional precision and high modulus of elasticity at high temperatures, electrical insulating materials and inexpensive fluorine-containing polymer materials.

Now, the present invention will be described in detail with reference to the preferred embodiments.

The fluorine-containing polymer (b) to be used in the present invention, may, for example, be a homopolymer of a fluoroolefin such as tetrafluoroethylene or chlorotrifluoroethylene, or a copolymer of such a fluoroolefin with a fluorine-containing monomer such as hexafluoropropylene, a perfluoro(alkylvinyl ether), vinylidene fluoride or vinyl fluoride. Further, a copolymer of the above fluoroolefin with an α-olefin containing no fluorine, such as ethylene, propylene or butene, may also be used.

Specific examples of the fluorine-containing polymer (b) include a tetrafluoroethylene polymer or copolymer, a chlorotrifluoroethylene polymer or copolymer, a tetrafluoroethylene-hexafluoropropylene copolymer (hereinafter referred to as FEP), a tetrafluoroethylene-perfluoro(alkylvinyl ether) copolymer (hereinafter referred to as PFA), an ethylene-tetrafluoroethylene copolymer (hereinafter referred to as ETFE), an ethylene-chlorotrifluoroethylene copolymer and a tetrafluoroethylene-propylene copolymer. Particularly preferred is FEP or PFA.

The polymer (c) containing no fluorine atom may, for example, be common resins and engineering plastics, such as polyethylene, polypropylene, polystyrene, a styrene resin, a vinly chloride resin, polymethylpentene, an acrylic resin, a urethane resin, a silicone resin, polyvinyl alcohol, polyamide (such as nylon 12), polycarbonate (hereinafter referred to as PC), polybutylene terephthalate (hereinafter referred to as PBT), polyacetal, polyphenylene oxide, polyphenylene sulfide (hereinafter referred to as PPS), polysulfone, liquid crystal polyester (such as polyoxybenzolyl which is hereinafter referred to as POB), polyamideimide (hereinafter referred to as PAI), polyimide, polyether imide (hereinafter referred to as PEI), polyether sulfone (hereinafter referred to as PES), polyether ether ketone and amorphous polyacrylate.

The polymer (c) is particularly preferably the one having, at the terminal of the polymer (c) or in its molecule, an amino group which has a good reactivity with a functional group such as an epoxy group, a carboxyl group or a carboxylic anhydride residue contained in the grafted fluorine-containing polymer (a).

The fluorine-containing polymer (d) before grafting to be used in the present invention, is a fluorine-containing polymer of the type wherein fluorine atoms are bonded to carbon atoms of the main chain. Further, it is required to contain hydrogen atoms bonded to the carbon atoms of the main chain. Such a fluorine-containing polymer (d) has a characteristic such that the hydrogen atoms bonded to the main chain are relatively unstable as compared with the fluorine atoms and likely to be withdrawn from the carbon atoms by the action of radicals or the like. The grafting compound will bond to the carbon atoms from which the hydrogen atoms have been withdrawn, whereby grafting takes place. In the present invention, since the grafting compound has a functional group capable of providing an adhesive property, the adhesive property will be imparted to the fluorine-containing polymer by the grafting.

As the fluorine-containing polymer (d) before grafting to be used in the present invention, a homopolymer or a copolymer of a fluoroolefin is preferred. However, in a case of a fluoroolefin having no hydrogen atom on either one of the two carbon atoms of the polymerizable unsaturated group, such as tetrafluoroethylene or chlorotrifluoroethylene, it is necessary to copolymerize it with a monomer having at least one hydrogen atom bonded on either one of the two carbon atoms of the polymerizable unsaturated group.

As the fluoroolefin having hydrogen atoms bonded on the polymerizable unsaturated group, vinylidene fluoride or vinyl fluoride may, for example, be mentioned. A homopolymer of such a fluoroolefin can be used as the fluorine-containing polymer (d) before grafting to be used in the present invention. Further, a copolymer of such a monomer with another monomer may also be employed. As such another monomer, various fluorine-containing monomers as well as monomers containing no fluorine atom, may be employed.

As the monomer to be copolymerized with a fluoroolefin having no hydrogen atom bonded on either one of the two carbon atoms of the polymerizable unsaturated group, an olefin (namely, a hydrocarbon type olefin) is preferred. Particularly preferred is an α-olefin such as ethylene, propylene or butene. However, the monomer is not limited to an α-olefin, and various monomers including fluoroolefins having hydrogen atoms on the unsaturated groups, such as vinylidene fluoride and (perfluorobutyl)ethylene, and vinyl ethers such as an alkylvinyl ether and a (fluoroalkyl)vinyl ether, may be used. Further, together with such a monomer, a monomer having no hydrogen atom bonded on the polymerizable unsaturated group, such as hexafluoropropylene or a perfluoro(alkylvinyl ether) may be used as a third monomer.

Preferred as the fluorine-containing polymer (d) before grafting is ETFE, a tetrafluoroethylene-propylene copolymer, or a copolymer of vinylidene fluoride. Particularly preferred is ETFE.

In a case where the preferred fluorine-containing polymer (d) is a copolymer, and the comonomer is a monomer containing no fluorine atom, it is preferred that the proportion of polymerized units of the fluorine-containing monomer in the fluorine-containing polymer (d) is at least 40 mol %, based on the total polymerized units.

If the proportion of the polymerized units of the fluorine-containing monomer is lower than this range, the compatibility with the fluorine-containing polymer (b) tends to deteriorate, and it will be difficult to obtain a satisfactory polymer alloy.

By grafting a grafting compound to the fluorine-containing polymer (d), it is possible to obtain a grafted fluorine-containing polymer (a) having a large adhesive strength even to a material to which the adhesion used to be inadequate or impossible. The linking group in the grafting compound is a group which makes grafting to the fluorine-containing polymer (d) possible. As such a linking group, an unsaturated or saturated hydrocarbon group which is involved in addition or association of radicals, or an amino group or a phenolic hydroxyl group which is involved in nucleophilic reaction, may, for example, be mentioned. Further, it may be a group which readily forms radicals, such as a peroxy group or an azo group. Preferred linking groups include a group having a carbon-carbon unsaturated bond (particularly an organic group having an α,β-unsaturated double bond at its terminal), a peroxy group and an amino group.

The functional group is a group having a reactivity or polarity, which is capable of imparting an adhesive property to the grafted fluorine-containing polymer. Two or more such functional groups may be present per molecule of the grafting compound. Such two or more functional groups may be the same or different from one another. Such a functional group may, for example, be a carboxyl group, a residual group having two carboxyl groups in one molecule condensed by dehydration (hereinafter referred to as a carboxylic anhydride residue), an epoxy group, a hydroxyl group, an isocyanate group, an ester group, an amide group, an aldehyde group, an amino group, a hydrolyzable silyl group or a cyano group.

Preferred as the functional group are a carboxylic anhydride residue, an epoxy group and a hydrolyzable silyl group. Particularly preferred is a carboxylic anhydride residue.

Preferred as the grafting compound is a compound which, as mentioned above, has a linking group selected from the group consisting of an organic group having an α,β-unsaturated double bond at its terminal, a peroxy group and an amino group, and at least one functional group selected from the group consisting of a carboxylic anhydride residue, an epoxy group and a hydrolyzable silyl group. Among them, particularly preferred is an unsaturated polycarboxylic anhydride, an unsaturated carboxylic acid, an epoxy group-containing unsaturated compound, a hydrolyzable silyl group-containing unsaturated compound or an epoxy group-containing peroxy compound.

The unsaturated polycarboxylic anhydride may, for example, be maleic anhydride, itaconic anhydride, citraconic anhydride, or bicyclo[2.2.1]hept-2-ene-5,6-dicarboxylic anhydride. The unsaturated carboxylic anhydride may, for example, be acrylic acid, methacrylic acid, maleic acid, monomethyl maleate, fumaric acid, itaconic acid, citraconic acid, crotonic acid, or bicyclo[2.2.1]hept-2-ene-5,6-dicarboxylic acid.

The epoxy group-containing unsaturated compound may, for example, be glycidyl acrylate, glycidyl methacrylate, or allyl glycidyl ether.

Preferred as the hydrolyzable silyl group-containing unsaturated compound is a compound wherein one organic group containing an unsaturated group such as a vinyl group, an allyl group, a methacryloyloxyalkyl group or an acryloyloxyalkyl group and two or three hydrolyzable groups such as alkoxy groups or acyl groups are bonded to a silicon atom. When one unsaturated group-containing organic group and two hydrolyzable groups are bonded to a silicon atom, the remaining group is preferably a lower alkyl group such as a methyl group. Specifically, such a hydrolyzable silyl group-containing unsaturated compound may, for example, be vinyl trimethoxysilane, vinyl triethoxysilane, vinyl triacetoxysilane, γ-methacryloxypropyltrimethoxysilane or vinyl tris(β-methoxyethoxy)silane.

The peroxy compound may, for example, a diacyl peroxide, a ketone peroxide, a hydroperoxide or a peroxy carbonate, and it may further be a compound having the above described functional group. As the peroxy compound, a grafting compound of a polymer type which will be described hereinafter, is used.

The following unsaturated compounds may, for example, be mentioned as grafting compounds other than those described above: an unsaturated compound having a hydroxyl group such as allyl alcohol, N-methylol acrylamide or N-methylol methacrylamide; an unsaturated carboxylate such as methyl acrylate, methyl methacrylate, dimethyl maleate, diethyl fumarate, dimethyl itaconate, diethyl citraconate or diethylene glycol bis(allyl carbonate [$CH_2$=$CHCH_2OCOOC_2H_4)_2O$] (hereinafter referred to as CR-39 monomer); an unsaturated acid amide such as acrylamide, N-methylacrylamide or N,N-dimethylmethacrylamide; an unsaturated amine such as allyl amine, methylaminoethyl methacrylate, t-butylaminoethyl methacrylate or aminostyrene; an unsaturated compound having a cyano group such as cyano acrylate or cyano methacrylate; and an unsaturated aldehyde such as aclorein or croton aldehyde.

As described above, the grafting compound may be a compound having a saturated hydrocarbon group which is involved in addition or association of radicals or a compound having an amino group or a phenolic hydroxyl group which is involved in a nucleophilic reaction, other than the above unsaturated group-containing compound. The following compounds may, for example, be mentioned as the grafting compound of this type: a compound having two or more amino groups, or a compound having an amino group and another functional group, such as hexamethylenediamine, ethanolamine, diethanolamine, γ-aminopropyltriethoxysilane, N-(β-aminoethyl)-γ-aminopropylmethyldimethoxysilane, or γ-anilinopropyltrimethoxysilane.

The grafting compound may be a polymer having a linking group such as a peroxy group or an amino group and a functional group capable of providing an adhesive property. For example, a copolymer of a polymerizable unsaturated peroxide such as t-butylperoxymethacryloyloxyethyl carbonate with a polymerizable unsaturated compound having a carboxyl group, a carboxylic anhydride residue, an epoxy group or a hydrolyzable silyl group, can be used as the grafting compound of a polymer type. Likewise, a copolymer obtained by copolymerizing a polymerizable unsaturated amine with the above-mentioned polymerizable unsaturated compound having a functional group, may also be used.

The amount of the grafting compound to be used for grafting is usually from 0.01 to 100 parts by weight, preferably from 0.1 to 20 parts by weight, per 100 parts by weight of the fluorine-containing polymer (d). In the case of a grafting compound of a polymer type, it may be used in a larger amount. However, the upper limit is preferably at a level of about 50 parts by weight. A preferred amount of the grafting compound other than the polymer type, is from 0.5 to 10 parts by weight.

The obtained fluorine-containing polymer (a) is the one wherein some of hydrogen atoms bonded to the main chain of the fluorine-containing polymer (d) are grafted by the grafting compound. If the amount of the grafting compound used, is too small, the amount of the grafted fluorine-containing polymer (a) to be formed in the fluorine-containing polymer (d) will be small and the adhesive property tends to be inadequate. On the other hand, if the amount is too much, the excellent properties of the fluorine-containing polymer (d) tend to be impaired.

As a method for grafting the grafting compound to the fluorine-containing polymer (d), a method is preferred wherein both reactants are subjected to an association reaction in the presence of a radical-forming agent. However, when a radical-forming grafting compound such as a compound having a peroxy group is employed, it is unnecessary to use other radical-forming agent. The amount of the radical-forming agent is not particularly limited, but is usually from 0.1 to 10 parts by weight per part by weight of the grafting compound.

The grafting is believed to be accomplished by the following reaction mechanism. Firstly, a radical formed from the radical-forming agent will remove a hydrogen atom from the fluorine-containing polymer (d) to form a fluorine-containing polymer (d) radical. On the other hand, a radical formed from the radical-forming agent will attach to the grafting compound or will remove a hydrogen atom from the grafting compound to form a radical. Then, both radicals will associate to complete grafting. Otherwise grafting can be achieved also by direct addition of the fluorine-containing polymer (d) radical to an unsaturated hydrocarbon group of the grafting compound. Grafting is believed to occur also by various other reaction mechanisms.

The grafting reaction is preferably conducted by melt-mixing the fluorine-containing polymer (d) and the grafting compound, together with a radical-forming agent when such a radical-forming agent is required, at a radical-forming temperature. In some cases, a solvent may be used to form a fluorine-containing polymer (d) solution, and the grafting reaction may be conducted in this solution. It is most preferred to employ a method wherein the grafting reaction is carried out while conducting the melt-mixing in an extrusion molding machine or an injection molding machine. The grafted fluorine-containing polymer (a) may be formed into a molding material such as pellets.

It is preferred that the radical-forming agent to be used for the grafting reaction has a decomposition temperature within a range of from 120 to 300° C. and its half-life period at the grafting reaction temperature is about one minute. Specifically, benzoyl peroxide, dichlorobenzoyl peroxide, dicumyl peroxide, 2,5-dimethyl-2,5-di(benzoylperoxy) hexyne-3,1,4-bis(tert-butylperoxyisopropyl)benzene, lauroyl peroxide, t-butyl peracetate, 2,5-dimethyl-2,5-di(t-butylperoxy)hexyne-3,2,5-dimethyl-2,5-di(t-butylperoxy) hexane, t-butyl perbenzoate or t-butyl perphenylacetate is, for example, preferred.

Likewise, as the above-mentioned polymerizable unsaturated peroxide, it is preferred that the decomposition temperature of the peroxy group in the copolymer is within a range of from 120 to 300° C., and the half-life period at the grafting reaction temperature is about one minute. As a specific polymerizable unsaturated peroxide, t-butyl peroxymethacryloyloxyethyl carbonate, t-butylperoxyallyl carbonate, t-amylperoxyacryloyloxyethyl carbonate, t-hexylperoxyacryloyloxyethyl carbonate, 1,1,3,3-tetramethylbutylperoxyacryloyoxyethyl carbonate, cumylperoxyacryloyloxyethyl carbonate or p-isopropylcumylperoxyacryloyloxyethyl carbonate is, for example, preferred.

The fluorine-containing polymer alloy can be produced by melt-mixing at a radical-forming temperature a composition comprising the fluorine-containing polymer (d) having hydrogen atoms bonded to carbon atoms of its main chain, the grafting compound capable of grafting to the fluorine-containing polymer (d), a radical-forming agent and the polymer (c) containing no fluorine atom. Further, it is also possible to produce a fluorine-containing polymer alloy by adding the fluorine-containing polymer (b') other than the fluorine-containing polymer (d), to the above composition.

Otherwise, the fluorine-containing polymer alloy can be produced by adding the polymer (c) containing no fluorine atom and the fluorine-containing polymer (b') to the grafted fluorine-containing polymer (a).

The fluorine-containing polymer (b') may or may not contain the grafted fluorine-containing polymer (a). Further, it may or may not be used for the preparation of the fluorine-containing polymer alloy.

As the fluorine-containing polymer (b') to be used in the present invention, a homopolymer of a fluoroolefin such as tetrafluoroethylene or chlorotrifluoroethylene, or a copolymer of such fluoroolefin with a fluorine-containing monomer containing no hydrogen, such as hexafluoropropylene or a perfluoro(alkylvinyl ether), may be employed. Specific examples of such a fluorine-containing polymer (b') include a tetrafluoroethylene copolymer, a chlorotrifluoroethylene copolymer, FEP and PFA.

Further, the fluorine-containing polymer alloy may be molded by melt-mixing in a molding machine at a radical-forming temperature, a composition comprising the fluorine-containing polymer (d), the grafting compound capable of grafting to the fluorine-containing polymer (d), a radical-forming agent and the polymer (c) containing no fluorine atom, or a composition prepared by adding to such a composition a fluorine-containing polymer (b') which is other than the fluorine-containing polymer (d).

Otherwise, the fluorine-containing polymer alloy may be molded by melt-mixing in a molding machine a composition prepared by adding the polymer (c) containing no fluorine atom and the fluorine-containing polymer (b') to the grafted fluorine-containing polymer (a).

The fluorine-containing polymer alloy of the present invention comprises the grafted fluorine-containing polymer (a) and the polymer (c), and may or may not contain the fluorine-containing polymer (b). The blend proportions in a case where the fluorine-containing polymer (b) is not incorporated, are preferably such that the polymer (c) is from 10 to 90 wt %, and the grafted fluorine-containing polymer (a) is from 10 to 90 wt %. The blend proportions in a case where the fluorine-containing polymer (b) is incorporated, are preferably such that the polymer (c) is from 20 to 70 wt %, the grafted fluorine-containing polymer (a) is from 20 to 70 wt %, and the fluorine-containing polymer (b) is from 0.1 to 60 wt %.

In a case where the fluorine-containing polymer (a) is not used in the preparation of the fluorine-containing polymer alloy of the present invention, from 30 to 300 parts by weight of the polymer (c) and from 0.1 to 300 parts by weight of the fluorine-containing polymer (b') are used, per 100 parts by weight of the fluorine-containing containing polymer (d).

The fluorine-containing polymer alloy of the present invention can be used as a molding material for producing various molded products. In such a case, various fillers such as inorganic powder, glass fiber, carbon fiber, metal oxide or carbon, may be blended to the fluorine-containing containing polymer alloy within a range not to impair the properties. Further, other than the fillers, a pigment, an ultraviolet absorbent or other optional additives may be mixed thereto depending upon the particular purpose. These additives may be incorporated to the grafting reaction system so that the grafting reaction is conducted in the presence of the additives.

Using the fluorine-containing polymer alloy of the present invention as a molding material, a molded product can be produced by a conventional molding method such as injection molding, extrusion molding, co-extrusion molding, inflation molding, coating or transfer molding employing a mold.

Now, the present invention will be described in further detail with reference to Examples. However, it should be understood that the present invention is by no means restricted to such specific Examples.

Examples 1 to 5 are examples for the preparation of grafted ETFE. Examples 6 to 57 are examples for the production of fluorine-containing polymer alloys. Examples 58 to 72 are examples for molding the fluorine-containing polymer alloys. Further, Examples 58 to 62 are examples for molding tubes having an outer diameter of 5 mm and a wall thickness of 0.5 mm by means of a die for tube. Examples 63 to 67 are examples for molding films having a thickness of 100 μm by means of a die for film. Examples 68 to 72 are examples for forming an electrical wire coating having a thickness of 0.3 mm on a core wire having a diameter of 1 mm by means of a cross head die for electrical wire coating. Examples 73 to 85 are comparative examples.

EXAMPLES 1 TO 5

To 100 parts by weight of ETFE as the fluorine-containing polymer (d), 1.1 parts by weight of a grafting compound and 0.1 part by weight of dicumyl peroxide as a radical-forming agent, were melt-kneaded by means of a twin screw extruder to obtain pellets of grafted EFTE (hereinafter referred to as ETFE(e)) as the grafted fluorine-containing polymer (a). Table 1 shows ETFE used (Aflon LM 740A, Aflon COP C-88A, tradenames, manufactured by Asahi Glass Company Ltd.), their melting points (° C.), the grafting compound and the extrusion temperature (° C.).

EXAMPLES 6 TO 57

Shown in Tables 2 to 4 are the fluorine-containing polymer (b), the polymer (c) and ETFE(e) (as identified by Example No.) and their amounts as well as the extrusion temperature (° C.) of the fluorine-containing polymer alloy by a twin screw extruder, the particle size (μm) of the dispersed particles in the obtained fluorine-containing polymer alloy pellet as observed by an electron microscope, the injection molding temperature (° C.) for molding the pellets, and the tensile strength (kg/cm$^2$) of the molded product. "Parts" for the amounts is "parts by weight". In the fluorine-containing polymer alloy pellet, a component having a volume ratio of at most 50% is present in the form of dispersed particles, and the particle size of the dispersed particles is an average particle size (μm) thereof.

EXAMPLES 58 TO 72

To 100 parts by weight in total amount of the fluorine-containing polymer (b'), the polymer (c) and the fluorine-containing polymer (d), 1.1 parts by weight of vinyltrimethoxysilane as a grafting compound and 0.1 part by weight of dicumyl peroxide, were melt-kneaded by means of a twin screw extruder, and at the same time, a die was attached to the forward end of the twin screw extruder, so that a fluorine-containing polymer alloy was molded. Shown in Table 5 are the fluorine-containing polymer (b'), the polymer (c) and the fluorine-containing polymer (d), and their amounts, as well as the extrusion molding temperature (° C.), and the particle size (μm) of dispersed particles in the obtained molded product as observed by an electron microscope. "Parts" for the amounts is "parts by weight". In the molded product of the fluorine-containing polymer alloy, a component having a volume ratio of at most 50% is present in the form of dispersed particles, and the particle size of the dispersed particles is an average particle size (μm) thereof.

EXAMPLES 73 TO 85

Shown in Table 6 are the fluorine-containing polymer (d), the fluorine-containing polymer (b) and the polymer (c), and their amounts as well as the extrusion temperature (° C.) of the fluorine-containing polymer composition by means of a twin screw extruder, the particle size (μm) of dispersed particles in the obtained pellet of the fluorine-containing polymer composition, the injection molding temperature (° C.) for molding the pellets, and the tensile strength (kg/cm$^2$) of the molded product. In the pellet of the fluorine-containing polymer composition, a component having a volume ratio of at most 50% is present in the form of dispersed particles, and the particle size of the dispersed particles is an average particle size (μm) thereof.

TABLE 1

| Example No. | ETFE and its melting point, (° C.) | | Grafting compound | Extrusion temp. (° C.) |
|---|---|---|---|---|
| 1 | AflonLM | 740A 225 | Maleic anhydride | 265 |
| 2 | AflonLM | 740A 225 | Glycidyl methacrylate | 265 |
| 3 | AflonLM | 740A 225 | Vinyltrimethoxysilane | 265 |
| 4 | AflonCOP | C-88 260 | Vinyltrimethoxysilane | 290 |
| 5 | AflonLM | 740A 225 | CR-39 monomer | 265 |

TABLE 2

| Example No. | ETFE(e) (parts) | Fluorine-containing polymer (b) (parts) | Polymer (c) (parts) | Extrusion temp. (° C.) | Dispersed particle size (μm) | Injection temp. (° C.) | Tensile strength (kg/cm$^2$) |
|---|---|---|---|---|---|---|---|
| 6 | Ex.1 60 | — | Nylon12 40 | 260 | 0.7 | 300 | 530 |
| 7 | Ex.2 60 | — | Nylon12 40 | 260 | 1.0 | 300 | 420 |
| 8 | Ex.1 60 | — | PBT 40 | 260 | 0.8 | 300 | 490 |

TABLE 2-continued

| Example No. | ETFE(e) (parts) | Fluorine-containing polymer (b) (parts) | Polymer (c) (parts) | Extrusion temp. (° C.) | Dispersed particle size (μm) | Injection temp. (° C.) | Tensile strength (kg/cm$^2$) |
|---|---|---|---|---|---|---|---|
| 9  | Ex.2 60 | — | PBT 40 | 260 | 1.0 | 300 | 480 |
| 10 | Ex.3 60 | — | PBT 40 | 260 | 0.9 | 300 | 500 |
| 11 | Ex.1 20 | — | PBT 40 | 260 | 1.2 | 300 | 560 |
| 12 | Ex.2 20 | — | PBT 80 | 260 | 1.5 | 300 | 570 |
| 13 | Ex.3 20 | — | PBT 80 | 260 | 1.2 | 300 | 570 |
| 14 | Ex.1 60 | — | PC 40  | 280 | 1.5 | 300 | 510 |
| 15 | Ex.2 60 | — | PC 40  | 280 | 2.0 | 300 | 500 |
| 16 | Ex.3 60 | — | PC 40  | 280 | 1.6 | 300 | 520 |
| 17 | Ex.1 20 | — | PC 80  | 290 | 1.3 | 300 | 590 |
| 18 | Ex.2 20 | — | PC 80  | 290 | 1.7 | 300 | 600 |
| 19 | Ex.3 20 | — | PC 80  | 290 | 1.4 | 300 | 590 |
| 20 | Ex.2 60 | — | PPS 40 | 320 | 2.0 | 320 | 500 |
| 21 | Ex.3 60 | — | PPS 40 | 320 | 1.5 | 320 | 520 |
| 22 | Ex.4 60 | — | PPS 40 | 320 | 1.5 | 320 | 530 |
| 23 | Ex.5 60 | — | PPS 40 | 320 | 2.0 | 320 | 500 |
| 24 | Ex.2 20 | — | PPS 80 | 330 | 1.8 | 320 | 730 |
| 25 | Ex.3 20 | — | PPS 80 | 330 | 1.5 | 320 | 750 |
| 26 | Ex.4 20 | — | PPS 80 | 330 | 1.6 | 320 | 720 |

TABLE 3

| Example No. | ETFE(e) (parts) | Fluorine-containing polymer (b) (parts) | Polymer (c) (parts) | Extrusion temp. (° C.) | Dispersed particle size (μm) | Injection temp. (° C.) | Tensile strength (kg/cm$^2$) |
|---|---|---|---|---|---|---|---|
| 27 | Ex.5 20 | —      | PPS 80 | 330 | 2.0 | 320 | 700 |
| 28 | Ex.2 60 | —      | PEI 40 | 350 | 2.0 | 340 | 510 |
| 29 | Ex.3 60 | —      | PEI 40 | 350 | 1.7 | 340 | 540 |
| 30 | Ex.4 60 | —      | PEI 40 | 350 | 1.8 | 340 | 530 |
| 31 | Ex.2 20 | —      | PEI 80 | 360 | 2.2 | 340 | 810 |
| 32 | Ex.3 20 | —      | PEI 80 | 360 | 1.8 | 340 | 830 |
| 33 | Ex.4 20 | —      | PEI 80 | 360 | 1.6 | 340 | 850 |
| 34 | Ex.2 20 | FEP 40 | PPS 40 | 340 | 3.0 | 360 | 480 |
| 35 | Ex.3 20 | FEP 40 | PPS 40 | 340 | 2.5 | 360 | 490 |
| 36 | Ex.4 20 | FEP 40 | PPS 40 | 340 | 2.8 | 360 | 470 |
| 37 | Ex.2 20 | FEP 40 | PEI 40 | 360 | 3.2 | 360 | 500 |
| 38 | Ex.3 20 | FEP 40 | PEI 40 | 360 | 2.8 | 360 | 510 |
| 39 | Ex.4 20 | FEP 40 | PEI 40 | 360 | 2.9 | 360 | 510 |
| 40 | Ex.2 20 | FEP 40 | PAI 40 | 360 | 3.3 | 360 | 450 |
| 41 | Ex.3 20 | FEP 40 | PAI 40 | 360 | 3.0 | 360 | 460 |
| 42 | Ex.4 20 | FEP 40 | PAI 40 | 360 | 3.1 | 360 | 460 |
| 43 | Ex.2 20 | PFA 40 | PPS 40 | 350 | 3.0 | 370 | 470 |
| 44 | Ex.3 20 | PFA 40 | PPS 40 | 350 | 2.7 | 370 | 490 |
| 45 | Ex.4 20 | PFA 40 | PPS 40 | 350 | 2.9 | 370 | 500 |
| 46 | Ex.2 20 | PFA 40 | PEI 40 | 370 | 3.3 | 380 | 490 |
| 47 | Ex.3 20 | PFA 40 | PEI 40 | 370 | 2.7 | 380 | 520 |

TABLE 4

| Example No. | ETFE(e) (parts) | Fluorine-containing polymer (b) (parts) | Polymer (c) (parts) | Extrusion temp. (° C.) | Dispersed particle size (μm) | Injection temp. (° C.) | Tensile strength (kg/cm$^2$) |
|---|---|---|---|---|---|---|---|
| 48 | Ex.4 20 | PFA 40 | PEI 40 | 370 | 2.9 | 380 | 520 |
| 49 | Ex.2 20 | PFA 40 | PAI 40 | 370 | 3.5 | 380 | 450 |
| 50 | Ex.3 20 | PFA 40 | PAI 40 | 370 | 3.0 | 380 | 450 |
| 51 | Ex.4 20 | PFA 40 | PAI 40 | 370 | 3.2 | 380 | 460 |
| 52 | Ex.2 20 | PFA 40 | POB 40 | 380 | 3.4 | 380 | 490 |
| 53 | Ex.3 20 | PFA 40 | POB 40 | 380 | 3.1 | 380 | 490 |
| 54 | Ex.4 20 | PFA 40 | POB 40 | 380 | 3.3 | 380 | 500 |
| 55 | Ex.2 20 | PFA 40 | PES 40 | 380 | 3.2 | 380 | 480 |
| 56 | Ex.3 20 | PFA 40 | PES 40 | 380 | 2.8 | 380 | 490 |
| 57 | Ex.4 20 | PFA 40 | PES 40 | 380 | 2.9 | 380 | 490 |

TABLE 5

| Example No. | Fluorine-containing polymer (b') (parts) | Fluorine-containing polymer (d) (parts) | | Polymer (c) (parts) | | Extrusion temp. (° C.) | Dispersed particle size (μm) |
|---|---|---|---|---|---|---|---|
| 58 | — | AflonLM | 740A | 60 | PPS 40 | 310 | 2.0 |
| 59 | — | AflonLM | 740A | 60 | PC 40 | 290 | 1.8 |
| 60 | FEP 40 | AflonLM | 740A | 20 | PEI 40 | 350 | 3.2 |
| 61 | PFA 40 | AflonLM | 740A | 20 | PEI 40 | 370 | 3.3 |
| 62 | PFA 40 | AflonLM | 740A | 20 | POB 40 | 380 | 3.5 |
| 63 | — | AflonLM | 740A | 60 | PPS 40 | 310 | 2.2 |
| 64 | — | AflonLM | 740A | 60 | PC 40 | 290 | 2.1 |
| 65 | FEP 40 | AflonLM | 740A | 20 | PEI 40 | 350 | 3.1 |
| 66 | PFA 40 | AflonLM | 740A | 20 | PEI 40 | 370 | 3.0 |
| 67 | PFA 40 | AflonLM | 740A | 20 | POB 40 | 380 | 3.4 |
| 68 | — | AflonLM | 740A | 60 | PPS 40 | 320 | 1.8 |
| 69 | — | AflonLM | 740A | 60 | PC 40 | 300 | 2.0 |
| 70 | FEP 40 | AflonLM | 740A | 20 | PEI 40 | 350 | 3.3 |
| 71 | PFA 40 | AflonLM | 740A | 20 | PEI 40 | 370 | 3.2 |
| 72 | PFA 40 | AflonLM | 740A | 20 | POB 40 | 380 | 3.5 |

TABLE 6

| Example No. | Fluorine-containing polymer (d) or (b) (parts) | Polymer (c) (parts) | Extrusion temp. (° C.) | Dispersed particle size (μm) | Injection temp. (° C.) | Tensile strength (kg/cm$^2$) |
|---|---|---|---|---|---|---|
| 73 | ETFE 60 | Nylon-12 40 | 260 | 90 | 300 | 240 |
| 74 | ETFE 60 | PBT 40 | 260 | 70 | 300 | 270 |
| 75 | ETFE 60 | PC 40 | 280 | 40 | 300 | 280 |
| 76 | ETFE 60 | PPS 40 | 320 | 30 | 320 | 310 |
| 77 | ETFE 60 | PEI 40 | 350 | 30 | 340 | 300 |
| 78 | FEP 60 | PPS 40 | 340 | 25 | 360 | 290 |
| 79 | FEP 60 | PEI 40 | 360 | 20 | 360 | 310 |
| 80 | FEP 60 | PAI 40 | 360 | 30 | 360 | 280 |
| 81 | PFA 60 | PPS 40 | 350 | 25 | 370 | 300 |
| 82 | PFA 60 | PEI 40 | 370 | 20 | 380 | 330 |
| 83 | PFA 60 | PAI 40 | 370 | 30 | 380 | 290 |
| 84 | PFA 60 | POB 40 | 380 | 30 | 380 | 310 |
| 85 | PFA 60 | PES 40 | 380 | 30 | 380 | 290 |

The fluorine-containing polymer alloy of the present invention is a material which has the properties of a fluorine-containing polymer and the properties of various non-fluorine polymers including engineering plastics, simultaneously, and thus is expected to be applicable to various fields as a sliding material for which low friction and low abrasion are required, or as an electrical insulation material having high dimensional precision and high elasticity at high temperatures.

What is claimed is:

1. A fluorine-containing polymer alloy comprising:

10–90 wt. % of a grafted fluorine-containing polymer (a); and

10–90 wt. % of a polymer (c) containing no fluorine atom, said grafted fluorine-containing polymer (a) comprising a fluorine-containing polymer (d) having hydrogen atoms bonded to carbon atoms of its main chain and a grafting compound having a linking group capable of grafting to the fluorine-containing polymer (d) and a functional group capable of providing an adhesive property, grafted to the fluorine-containing polymer (d) in the presence of a radical forming agent, wherein either said grafted fluorine-containing polymer (a) or said polymer (c) containing no fluorine atoms has a dispersed particle size of at most 3.5 μm.

2. The fluorine-containing polymer alloy according to claim 1, which comprises 20–70 wt. % of said grafted fluorine-containing polymer (a); and 20–70 wt. % of said polymer (c) containing no fluorine atom. and further containing 0.1–60 wt. % of a fluorine-containing polymer (b) other than the grafted fluorine-containing polymer (a).

3. The fluorine-containing polymer alloy according to claim 2, wherein the fluorine-containing polymer (b) is at least one fluorine-containing polymer selected from the group consisting of a homopolymer of a fluoroolefin selected from tetrafluoroethylene and chlorotrifluoroethylene, a copolymer of said fluoroolefin with a perfluoro(alkylvinyl ether), and a copolymer of said fluoroolefin with hexafluoropropylene.

4. The fluorine-containing polymer alloy according to claim 1, wherein the fluorine-containing polymer (d) is an ethylene-tetrafluoroethylene copolymer.

5. The fluorine-containing polymer alloy according to claim 1, wherein the polymer (c) containing no fluorine atom is a polymer having an amino group.

6. The fluorine-containing polymer alloy according to claim 1, wherein the linking group of the grafting compound is at least one group selected from the group consisting of an organic group having an α,β-unsaturated double bond at its terminal, a peroxy group and an amino group, and the functional group capable of providing an adhesive property is at least one group selected from the group consisting of a carboxyl group, a carboxylic anhydride residue, an epoxy group and a hydrolyzable silyl group.

7. The fluorine-containing polymer alloy of claim 1, wherein said dispersed particle size is from 0.7–3.5 μm.

8. A molded article comprising the fluorine-containing polymer alloy of claim 1.

* * * * *